United States Patent [19]

Cosham et al.

[11] 3,846,895

[45] Nov. 12, 1974

[54] DUAL-IN-LINE PACKAGE EXTRACTION TOOL

[75] Inventors: Michael A. Cosham, Richmond, Ontario; Dieter O. Marx, Stittsville, Ontario, both of Canada

[73] Assignee: Microsystems International Limited, Montreal, Quebec, Canada

[22] Filed: Sept. 26, 1973

[21] Appl. No.: 400,941

[52] U.S. Cl. .................................. 29/203 H, 29/278
[51] Int. Cl. .............................................. B23p 19/04
[58] Field of Search .......... 29/253, 203 H, 203 HM, 29/278; 254/28, 104; 227/63

[56] References Cited

UNITED STATES PATENTS

| | | | |
|---|---|---|---|
| 1,359,777 | 11/1920 | Wright | 254/28 |
| 1,410,426 | 3/1922 | Torgerson | 254/28 |
| 3,625,482 | 12/1971 | Viel | 254/28 |
| 3,632,973 | 1/1972 | O'Keefe | 29/203 H |
| 3,785,033 | 1/1974 | Lynch | 29/203 H |

*Primary Examiner*—Al Lawrence Smith
*Assistant Examiner*—Harold P. Smith, Jr.

[57] ABSTRACT

An extraction tool for rapidly removing a plurality of dual-in-line packages from a corresponding plurality of dual-in-line slotted sockets arranged in straight rows in end-to-end configuration. The extraction tool, which has a long thin wedge or knife-like profile, is inserted between a dual-in-line package and its corresponding slotted socket at one end of a row of said slotted sockets, and sequentially slid along the slots of the dual-in-line sockets to sequentially remove and gather the dual-in-line packages thereon. A cover, overlying the upper edge and the upper portion of one wedge like face of said tool in spaced relationship, guides the dual-in-line packages as they slide along straddling the upper edge of said tool, and prevents said packages from jumping out of sequence and falling off said upper edge.

3 Claims, 3 Drawing Figures

DUAL-IN-LINE PACKAGE EXTRACTION TOOL

This invention relates to extraction tools for solid state components, and more particularly to an extraction tool for sequentially removing and gathering, in a single rectilinear motion, dual-in-line integrated circuit packages from a row of dual-in-line integrated circuit sockets.

Various forms of insertion and extraction tools are commonly employed by the semiconductor industry to insert and remove electronic components from testing equipment during quality assurance checks. One form of electronic package, known as the dual-in-line package or DIP is particularly troublesome to insert in and remove from its corresponding socket due to its small size and multiplicity of closely spaced terminal pins. As might be expected, removal of dual-in-line packages with extraction tools generally in use is time consuming and tedious as said extraction tools are usually designed for service applications wherein only one dual-in-line package is removed and inserted at one time.

A typical extraction tool in current use comprises a pair of opposing gripping fingers which grip opposite ends of a dual-in-line package, in a manner analogous to the thumb and forefinger of the human hand. After this extraction tool is secured to the dual-in-line integrated circuit package as aforesaid, said tool together with the dual-in-line integrated circuit package gripped by said tool are drawn away from the dual-in-line socket holding said package in a direction normal to the surface of said socket.

When a large number of dual-in-line packages are to be inserted and removed from a corresponding array of dual-in-line sockets, such as on a "burn-in board" or other form of test board, the removal of said packages may be greatly simplified by arranging dual-in-line sockets of a particular type in end-to-end configuration along a plurality of rows and using an extraction tool in accordance with the present invention.

Thus in accordance with the present invention an extraction tool is provided for sequentially removing and gathering a plurality of dual-in-line multi-pin integrated circuit packages from a plurality of dual-in-line integrated circuit sockets rectilinearly arranged in end-to-end configuration on a planar supporting surface, each of said sockets being provided with a rectangular central slot, of substantially uniform width and depth, running parallel to the rows of pins of said each of said sockets. Said extraction tool comprises a substantially rigid longitudinal member having a pair of substantially wedge-shaped side faces, separated by a lower edge of a thickness less than the width of the rectangular central slot of any one of said sockets and an upper edge of a thickness less than the minimum distance between the two parallel rows of pins of any one of said integrated circuit packages, the wedge-shaped side faces having a width increasingly tapering from a first measure less than the depth of the rectangular central slot of any one of said sockets to a second measure greater than the maximum distance the pins of said packages extend into the dual-in-line sockets; and a resilient longitudinal cover connected to said wedge like member and overlying, in spaced relationship, the upper edge and a portion of at least one side face thereof by a distance sufficient to permit a row of dual-in-line integrated circuit packages to straddle said upper edge and readily slide along the length of said longitudinal member without buckling significantly to jam, or jumping out of sequence.

Whereby, by sliding the lower edge of said longitudinal member along the rectangular central slots of the dual-in-line integrated circuit sockets, the dual-in-line integrated circuit packages are sequentially removed from their corresponding dual-in-line integrated circuit sockets and slid astraddle and along the upper edge of said longitudinal member into the space bounded by said longitudinal member and said longitudinal cover. It can now be seen how a long row of dual-in-line integrated circuit packages can be removed in seconds from their corresponding dual-in-line sockets by a simple and single rectilinear thrust of an extraction tool made in accordance with the present invention. Primarily because of the resilient longitudinal cover, said extraction tool can be used to gather and maintain thereon a plurality of dual-in-line integrated circuit packages in sequence and can be readily unloaded by sliding dual-in-line packages gathered by said tool in undisturbed sequence into a "stick" or transport tube.

An example of one embodiment of the invention will now be described with reference to the accompanying drawings in which.

Figures 1, 2, 3:
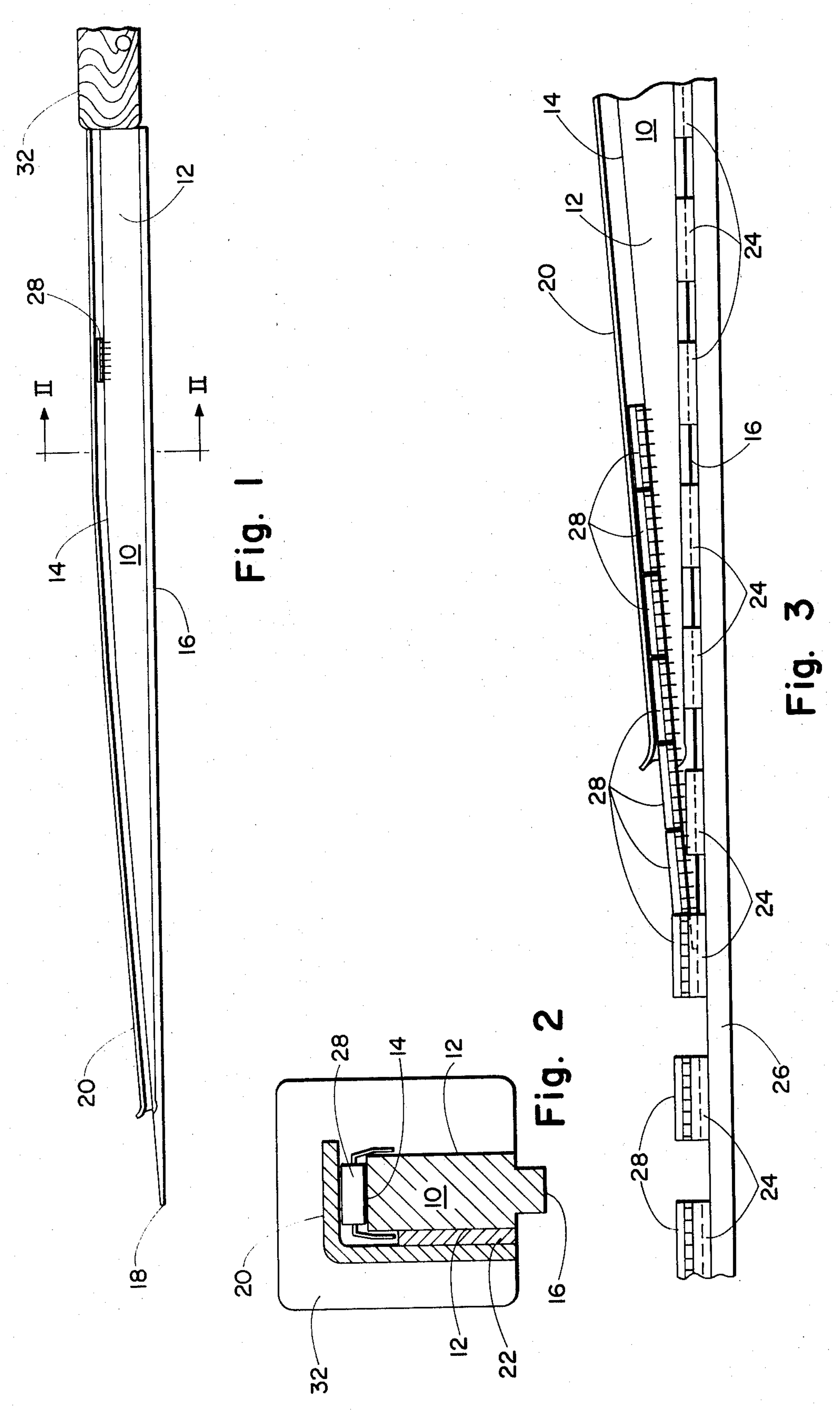
FIG. 1 is a side view of an extraction tool in accordance with the present invention with one dual-in-line package located thereon.
FIG. 2 is a cross-section of the extraction tool and an end view of the dual-in-line package illustrated in FIG. 1.
FIG. 3 is a profile drawing illustrating an extraction tool in the process of extracting dual-in-line packages from a row of dual-in-line sockets.

With reference to FIGS. 1 and 2 of the drawings the extraction tool comprises a longitudinal member 10 having a pair of wedge-shaped side faces 12 bridged by an upper edge 14 and a lower edge 16.

As shown, in cross-section, in FIG. 2 of the drawings, the wedge-shaped side faces 12 are generally planar and parallel, however said faces 12 need not be either planar or parallel provided certain dimensional considerations are met. For example the wedge-shaped side faces 12 may converge somewhat from the upper edge 14 to the lower edge 16 of the longitudinal member 10 so as to appear as a somewhat truncated triangle in cross-section, and said side faces may appear concave, convex, fluted or with other non-linear forms in cross-section. In general the cross-section of the longitudinal member must be such that the upper edge 14 and the abutting upper portions of the wedge-shaped side faces 12 support a dual-in-line package astraddle said upper edge 14 while allowing said package to slide readily along said upper edge 14.

The lower edge 16 should preferably be flat and straight and of a width slightly less than the minimum width of the rectangular central slot of a slotted dual-in-line socket. As shown in cross-section in FIG. 2 of the drawings, the lower edge 16 is preferably made to the required dimensions by providing a groove on the lower portion of both wedge-shaped side faces 12. Alternatively a thin runner of a width slightly less than the minimum width of the rectangular central slot of a dual-in-line socket, and of a thickness comparable to the depth of the rectangular central slot of a dual-in-line socket may be centered and fastened along the lower edge of the longitudinal member 12. As not all dual-in-line sockets are provided with a central slot of standard dimensions, it is understood that a given extraction tool, made in accordance with the present invention, is intended for use with, and is dimensionally designed for a dual-in-line socket having a central slot of predetermined size.

As shown in FIGS. 1 and 3, the wedge-shaped side faces 12 should taper in width from a first measure, measured at the leading edge 18 of the longitudinal member 10 of less than the slot depth of a slotted dual-in-line socket (in order that said leading edge 18 can readily enter a slotted dual-in-line socket and get beneath the dual-in-line package inserted therein) to a second measure or width greater than the depth of penetration of the pins of a dual-in-line package into a dual-in-line socket. In its preferred form the wedge-shaped side face 12 increasingly tapers over a smooth curve from said first measure to said second measure, where said second measure is several times the nominal length of the pins of a dual-in-line package. The rate of increase in taper from said first to said second measure being such that the dual-in-line packages are removed from their corresponding dual-in-line sockets without appreciably bending the pins of said packages.

The longitudinal member 10 may be of metal, wood, plastic or other material of sufficient rigidity and may be made, depending on the choice of material, by machining, extrusion and machining, molding or other conventional fabrication processes.

As shown in FIG. 2 of the drawings, an L-shaped longitudinal resilient cover 20 is attached to the longitudinal member 10 and spaced from one wedge-shaped side face 12 of said member 10 by a spacer strip 22. Said L-shaped cover 20 overlies the upper edge 14 of the longitudinal member 10 and is spaced from said upper edge 14 by a distance slightly greater than the nominal thickness or depth of the body of a dual-in-line package. To allow for normal variation in package thickness the spacing between the upper edge 14 of the longitudinal member 10 and the overlying resilient longitudinal cover 20 is preferably slightly greater than the nominal thickness of one dual-in-line package but less than twice said nominal thickness. By spacing said cover 20 from the upper edge 14 of said member 10 as aforesaid, a line or train of dual-in-line packages may be readily slid astraddle said upper edge 14 without buckling and jamming and without falling out of their sequence of entry into the extraction tool. The thickness of the spacer strip 22, which is shown only in cross-section in FIG. 2, but which extends along the length of said cover 20, is so chosen and positioned relative to the top edge 14 of said member 10 so as to allow dual-in-line packages to freely straddle the upper edge 14 of the longitudinal member 10 by providing space sufficient for the row of pins protruding from one side of each dual-in-line package. The longitudinal cover 20 may be made of any suitable resilient material such as plastic or metal and may be fastened to the longitudinal member by any suitable means such as screws, rivets or welding. Although the longitudinal cover 20 is shown as L-shaped in FIG. 2 it may have other shapes such as an inverted U-shape or a channel-like shape and it may be fastened to one or both wedge-shaped side faces of the longitudinal member 10.

For ease of handling, a handle 32 is fastened to one end of the longitudinal member 10 as shown in FIGS. 1 and 2 of the drawings. The longitudinal member 10 is preferably designed to a length sufficient to span all the dual-in-line sockets 24 arranged in one row on the test board 26, in order that all the dual-in-line packages may be removed from a given row by a single rectilinear thrust of the extraction tool.

Two or more extraction tools may be joined such that the longitudinal member 10 of each are parallel to each other and spaced apart a distance corresponding to the distance between given rows of DIP sockets 24 on a test board 26 in order that more than one row of DIP's can be removed with a single thrust.

In operation, the leading edge 18 of the longitudinal member 10 is inserted into the slot between a dual-in-line package and its corresponding dual-in-line socket positioned at one end of a row of dual-in-line sockets, and the lower edge 16 of said longitudinal member is mated with and slid along the central slot provided on said socket. As the extraction tool is slid along the central slots (not shown) of a row of sockets 24, which are secured to a supporting test board 26, the dual-in-line packages 28 are sequentially lifted from their corresponding sockets 24 and progressively slid along the upper edge 14 of the longitudinal member 10 as shown in FIG. 3.

What is claimed is:

1. An extraction tool for sequentially removing and gathering a plurality of dual-in-line multipin integrated circuit packages from a plurality of dual-in-line integrated circuit sockets rectilinearly arranged in end-to-end configuration on a planar supporting surface, each of said sockets being provided with a rectangular central slot, of substantially uniform width and depth, running parallel to the rows of pins of said each of said sockets, said extraction tool comprising;

a. a substantially rigid longitudinal member having a pair of substantially parallel wedge-shaped side faces, bridged by an upper edge of a thickness less than the minimum distance between the two parallel rows of pins of any one of said integrated circuit packages and having a lower edge of a thickness less than the width of the rectangular central slot of any one of said sockets, the thickness of said lower edge less than the thickness of said upper edge by a groove running longitudinally along the portion of each wedge-shaped side face near the lower edge of said longitudinal member to form a rigid longitudinal member of substantially T-shaped cross-section, the wedge-shaped side faces having a width increasingly tapering from a first measure less than the depth of the rectangular central slot of any one of said sockets to a second measure greater than the maximum distance the pins of said packages extend into the dual-in-line sockets;

b. a resilient longitudinal cover connected to said wedge like member and overlying, in spaced relationship, the upper edge and a portion of at least one wedge-shaped side face thereof by a distance sufficient to permit a row of dual-in-line integrated circuit packages to straddle said upper edge and readily slide along the length of said longitudinal member without buckling sufficiently to jam out of sequence;

whereby, by sliding the lower edge of said longitudinal member along the rectangular central slots of the dual-in-line integrated circuit sockets, the dual-in-line integrated circuit packages are sequentially removed from their corresponding dual-in-line integrated circuit sockets and slid astraddle and along the upper edge of said longitudinal member into the space bounded by said longitudinal member and said longitudinal cover.

2. The invention as defined in claim 1 wherein the longitudinal cover has a substantially L-shaped cross-section and is spaced from and connected to one wedge-shaped side face of said longitudinal member near the upper edge thereof, the space between the upper edge of said longitudinal member and said overlying longitudinal cover being greater than the thickness or height of one multi-pin integrated circuit package but less than twice said thickness or height, and the space between said one wedge-shaped side face of said longitudinal member and said cover being sufficient to accommodate a row of pins of a dual-in-line integrated circuit package straddling the upper edge of said longitudinal member.

3. The invention as defined in claim 1 wherein the longitudinal cover has a substantially channel-shaped cross-section, and is connected to at least one wedge-shaped side face of said longitudinal member near the upper edge thereof, the space between the upper edge of said longitudinal member and said overlying longitudinal cover being greater than the thickness or height of one multi-pin integrated circuit package, but less than twice said thickness or height, and the space between each wedge-shaped side face of said longitudinal member and said cover being sufficient to accommodate a row of pins of a dual-in-line integrated circuit package straddling the upper edge of said longitudinal member.

* * * * *